US006704555B2

(12) United States Patent
Sih et al.

(10) Patent No.: US 6,704,555 B2
(45) Date of Patent: Mar. 9, 2004

(54) APPARATUS AND METHOD FOR CALIBRATING LOCAL OSCILLATION FREQUENCY IN WIRELESS COMMUNICATIONS (75) Inventors: Gilbert C. Sih, San Diego, CA (US); Raghu Challa, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 314 days.

(21) Appl. No.: 09/804,707

(22) Filed: Mar. 12, 2001

(65) Prior Publication Data

US 2002/0123316 A1 Sep. 5, 2002

Related U.S. Application Data

(60) Provisional application No. 60/260,832, filed on Jan. 9, 2001.

(51) Int. Cl.[7] ................................................ H04B 1/06
(52) U.S. Cl. ...................... 455/245.1; 455/246.1; 455/191.3; 455/192.1; 455/255
(58) Field of Search .......................... 455/243.1, 245.1, 455/227, 232.1, 240.1, 250.1, 255, 257, 258, 192, 192.1, 191.3, 190.1, 196.1, 246.1

(56) References Cited

U.S. PATENT DOCUMENTS 4,521,918 A * 6/1985 Challen ...................... 455/343
4,817,195 A * 3/1989 Kubo et al. ................. 455/192.2
5,579,346 A * 11/1996 Kanzaki ...................... 375/344
6,463,266 B1 * 10/2002 Shohara .................... 455/196.1
2001/0053192 A1 * 12/2001 Matsu et al. ................ 375/344

* cited by examiner

Primary Examiner—Congvan Tran
(74) Attorney, Agent, or Firm—Philip R. Wadsworth; Charles D. Brown; Howard H. Seo (57) ABSTRACT

According to a disclosed embodiment, a receiver comprising a digital rotator in combination with a frequency error discriminator in a digital automatic frequency control loop is used to arrive at accurate digital values used to calibrate a local oscillation frequency. A frequency error in the oscillation frequency of a local frequency generation loop causes a change in the baseband input signal frequency. The change in the baseband input signal frequency related to the frequency error in the local frequency generation loop can be detected as a phase rotation by the frequency error discriminator. By using the digital automatic frequency control loop, the frequency error introduced by the local frequency generation is determined with accuracy. The frequency error and corresponding control bits are entered into a calibration table. The calibration table may be used to adjust the local oscillation frequency for temperature changes, pilot frequency searching, and quick paging.

22 Claims, 4 Drawing Sheets

APPARATUS AND METHOD FOR CALIBRATING LOCAL OSCILLATION FREQUENCY IN WIRELESS COMMUNICATIONS

CROSS-REFERENCE TO RELATED APPLICATIONS

This application claims the benefit of provisional patent application entitled "Crystal Oscillator Calibration Using Digital Rotators," Ser. No. 60/260,432, filed on Jan. 9, 2001, which is incorporated herein by reference in its entirety for all purposes.

BACKGROUND OF THE INVENTION

1. Field of the Invention

The present invention generally relates to the field of wireless communication systems. More particularly, the present invention relates to a novel and improved apparatus and method for calibrating the crystal oscillator in a receiver to derive more accurate timing.

2. Related Art

In wireless communication systems, such as code division multiple access ("CDMA") systems, the transmitter and receiver are time synchronized for use in signal demodulation and decoding. In CDMA systems each user uniquely encodes its message signal into a transmission signal in order to separate the signal from those of other users. The intended receiver, knowing the code sequences of the user, can decode the transmission signal to receive the message.

Transmitter and receiver time synchronization can be achieved by transmitting a pilot signal from a base station to a mobile unit. The mobile unit can use the pilot signal to correct a local oscillator which the mobile unit uses as a timing reference. For example, in IS-95 and cdma2000 systems, by tracking the pilot signal, the mobile unit may obtain an accurate timing reference from the base station timing, which is derived from GPS.

The local oscillator used as a timing reference by the mobile unit is typically a crystal oscillator. The crystal oscillator may be a voltage controlled oscillator ("VCO"), for example, which uses a reference or tuning voltage to control, i.e. to change, the frequency of the oscillator. Other types of frequency control are also possible. For example, an oscillator could be a current controlled oscillator.

The oscillation frequency of a crystal oscillator may be affected by changes in the ambient temperature. A temperature compensated oscillator is designed to reduce or compensate for the change of oscillation frequency due to changes in temperature.

The oscillation frequency of the crystal oscillator is usually specified as a nominal frequency within a range of tolerance. For example, an oscillator may be specified as a 19.68 MHz (Mega-Hertz or million cycles per second) frequency oscillator rated at +/−5 parts per million ("ppm") error. Then, for example, if the 19.68 MHz oscillator is used to synthesize an 800 MHz carrier for application to an RF mixer, the synthesized carrier frequency applied to the RF mixer may be expected to be accurate to within 4,000 Hz error (5 parts per million×800 million Hz or 5×800 Hz). The frequency error may be corrected or compensated for by using, for example, an automatic frequency control loop composed of a frequency error detector, a loop filter, and a voltage controlled oscillator.

The frequency error detector, which is often referred to as a discriminator, computes a measure of the difference between the received carrier frequency and the synthesized carrier frequency, referred to as an "error measure". This error measure is filtered to produce a "digital" control signal that is converted into an analog tuning signal that is fed to the voltage controlled oscillator. Tuning the voltage controlled oscillator modifies the frequency of the synthesized carrier. In matching the received carrier frequency with the synthesized carrier frequency, this closed loop feedback corrects the timing of the local oscillator.

The frequency error of an oscillator may be affected by several factors. These factors may include (i) temperature, as noted above, (ii) aging of the crystal and other components, (iii) differences in operating voltages within and between mobile units, and (iv) differences in components from one mobile unit to another.

The multitude of different factors and their variability over time cause considerable difficulty in calibrating the digital control signal that is applied to correct the timing of the local oscillator. For this reason, calibration is typically not performed in current wireless mobile systems. Instead, frequency tracking using the feedback of an automatic frequency control loop is relied upon to push the digital control signal in the correct direction. In other words, the digital control signal has the correct arithmetic sign, positive or negative, but the magnitude of the digital control signal is not sufficiently exact for certain purposes in which it is desirable to translate a known, or predetermined, frequency error directly into a digital control signal to correct the timing of the local oscillator.

Figure 1:
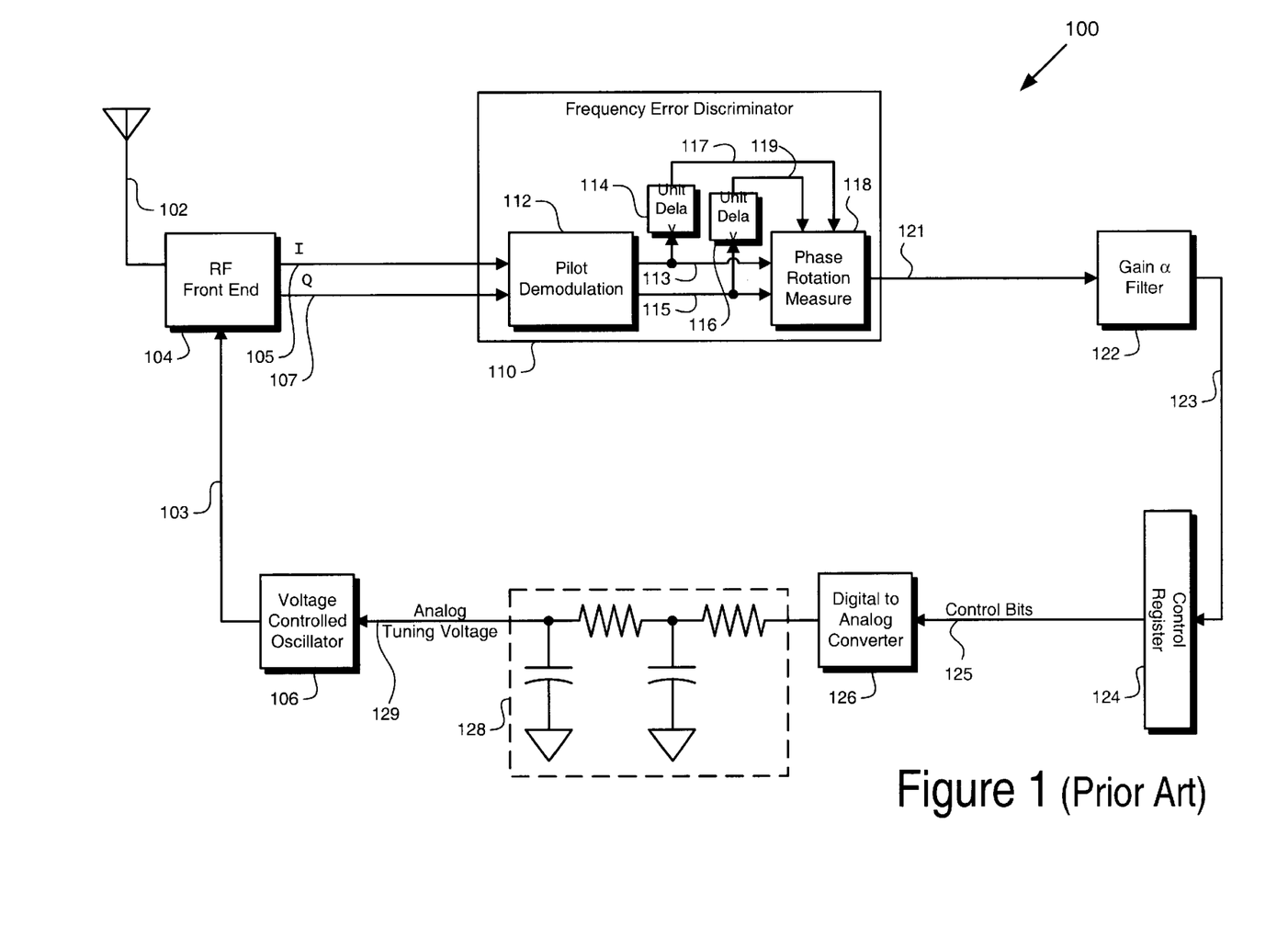
FIG. 1 illustrates, in block diagram form, one example of frequency tracking for a known receiver in a CDMA wireless communication system.

FIG. 1 illustrates a previous approach using frequency tracking in an automatic frequency control loop in a CDMA wireless communication system. Frequency tracking system 100 shown in FIG. 1 might, for example, constitute part of a receiver in a CDMA mobile unit. Frequency tracking system 100 may communicate, for example, via radio frequency ("RF") signal propagation between a base station transmit antenna (not shown) and receive antenna 102 connected to RF front end 104. RF front end 104 typically uses frequency synthesizers, which match the frequency of the RF carrier, to convert the RF signal to a baseband frequency signal, i.e. the encoded message signal before it was modulated onto the RF carrier for transmission which is more concisely referred to as a "baseband signal".

The frequency synthesizers used by RF front end 104 receive timing reference 103 from local oscillator 106, which is a voltage controlled oscillator ("VCO") in the present example. As seen in FIG. 1, the digital baseband signal has an in-phase component, referred to as I component 105, denoted "I" in FIG. 1, and a quadrature component, referred to as Q component 107, denoted "Q" in FIG. 1.

Continuing with FIG. 1, I component 105 and Q component 107 of the digital baseband signal are fed as an input signal to frequency error discriminator 110. Pilot demodulation module 112 demodulates the input signal as a sequence of symbols, also referred to as a "sequence of pilot symbols". Each pilot symbol has an I component 113 and a Q component 115 so that it can be represented as a vector in a 2-dimensional IQ plane, where the I component lies on the horizontal axis, and the Q component lies on the vertical axis. A frequency error, i.e. a mismatch between the carrier frequency synthesized to demodulate the incoming signal in RF front end 104 and the incoming carrier frequency, in local oscillator 106 causes the received sequence of baseband pilot symbols to rotate around the 2-dimensional IQ plane.

Each pilot symbol composed of I and Q components 113 and 115 is fed to unit delay elements 114 and 116, respectively, and also to phase rotation measure module 118. Unit delay elements 114 and 116 make previous pilot symbol composed of I and Q components 117 and 119, respectively, available to phase rotation measure module 118 at the same time as current pilot symbol composed of I and Q components 113 and 115, so that phase rotation measure module 118 can compute the phase rotation between successive pilot symbols. Each pilot symbol is represented as a vector in a 2-dimensional IQ plane, where the I component is mapped to the horizontal axis, and the Q component is mapped to the vertical axis.

Any 2-dimensional vector (x,y) can be represented in polar coordinates as (r, θ), where $r=\sqrt{x^2+y^2}$ and $$\theta = \tan^{-1}\left(\frac{y}{x}\right).$$

If, for example, the current pilot symbol composed of I component 113 and Q component 115 is represented in polar coordinates as $(r_1, \theta_1)$, and the previous pilot symbol composed of I component 117 and Q component 119 is represented in polar coordinates as $(r_0, \theta_0)$, then phase rotation measure module 118 outputs error measure 121 represented as the phase difference $(\theta_1-\theta_0)$ between successive pilot symbols. Thus, error measure 121 is directly proportional to the frequency error in local oscillator 106. Phase rotation measure module 118 outputs error measure 121 to gain α filter 122.

Continuing with FIG. 1, error measure 121, which may be a summed or averaged error measure, is fed to gain α filter 122. Gain α filter 122 provides a filtered error measure in the form of control bits 123 to control register 124. Control register 124 provides storage for control bits 123, which are output as control bits 125 to digital to analog converter 126. Digital to analog converter 126 converts control bits 125, which digitally represent a control value, into an analog quantity, such as a voltage whose quantity is directly proportional to the control value. RC filter network 128 filters out any residual fluctuations in the output voltage of digital to analog converter 126 to provide analog tuning voltage 129, i.e. control voltage, to local oscillator 106. Analog tuning voltage 129 changes the oscillation frequency of local oscillator 106, which changes timing reference 103, which changes the frequency of the frequency synthesizers used by RF front end 104. Thus, FIG. 1 shows one example of a previous approach to frequency tracking for a receiver in a CDMA wireless communication system.

In the example described in FIG. 1, an inexact "calibration" of the digital control signal is provided, for example, by supplying an empirical value for control bits 125 and allowing the frequency tracking system to run until stable. A more exact technique is needed for those instances in which it is desirable to translate a predetermined frequency error directly into a digital control signal to correct the timing of the local oscillator, i.e. where accurate calibration for adjustment of the digital control signal is required.

Accurate calibration is helpful, for example, in pilot searching, where an automatic frequency control loop cannot be run to correct the frequency error in the local oscillator because the pilot signal has not been acquired yet. When the mobile unit is turned on, the mobile unit must first "search" for the pilot signal. Typically, pilot searching is done by selecting an initial frequency for the local oscillator, and then performing a search for the pilot over a PN code space, i.e. by varying the phase of one or more PN codes. If the pilot is not found, the local oscillator frequency is adjusted upward or downward, and the pilot search is performed again over the whole PN code space. This process is repeated until the pilot signal is found. Without accurate calibration, frequency adjustments are not accurately controllable, reducing the efficiency of the frequency search.

Efficient and accurate calibration is also important in "quick paging". Quick paging works by placing the mobile unit in a reduced power consumption or "idle" mode. At regular intervals, the mobile unit "wakes up" and checks to see if it has any incoming calls. If the local oscillator is not correctly calibrated, the amount of "wake up" time required to check for incoming calls is too long, and thus, the power savings of idle mode can be substantially compromised.

Thus, there is a need in the art for more efficient and accurate techniques for calibration of local oscillator frequency in wireless communication systems. There is also need in the art for automatically calibrating, in the mobile unit of a wireless communication system, the control input to the local oscillator that is required to correct for the frequency error of the local oscillator. Moreover, there is a need in the art for automatically calibrating, in the mobile unit of a wireless communication system, the control input to the local oscillator that is required to correct for a predetermined frequency error.

SUMMARY OF THE INVENTION

According to the present invention, a receiver comprising a digital rotator in combination with a frequency error discriminator in a digital automatic frequency control loop is used to arrive at accurate digital values used to calibrate a local oscillation frequency.

In one aspect of the invention, a frequency error in the oscillation frequency of a local frequency generation loop causes a change in the baseband input signal frequency during demodulation of the input signal. The change in the baseband input signal frequency related to the frequency error in the local frequency generation loop can be detected, for example, as a phase rotation by the frequency error discriminator. By using the digital automatic frequency control loop, including the digital rotator and the frequency error discriminator, the frequency error introduced by the local frequency generation loop can be determined with a high degree of accuracy.

For example, the frequency error can be determined when the digital automatic frequency control loop operation becomes stable, i.e. the frequency error is no longer substantially changing. The frequency error and corresponding control bits are entered into a calibration table, for example, in a mobile unit's memory. The calibration table may be used, for example, to adjust the local oscillation frequency for temperature changes, pilot frequency searching, and quick paging.

DETAILED DESCRIPTION OF THE PREFERRED EMBODIMENTS

Figure 2:
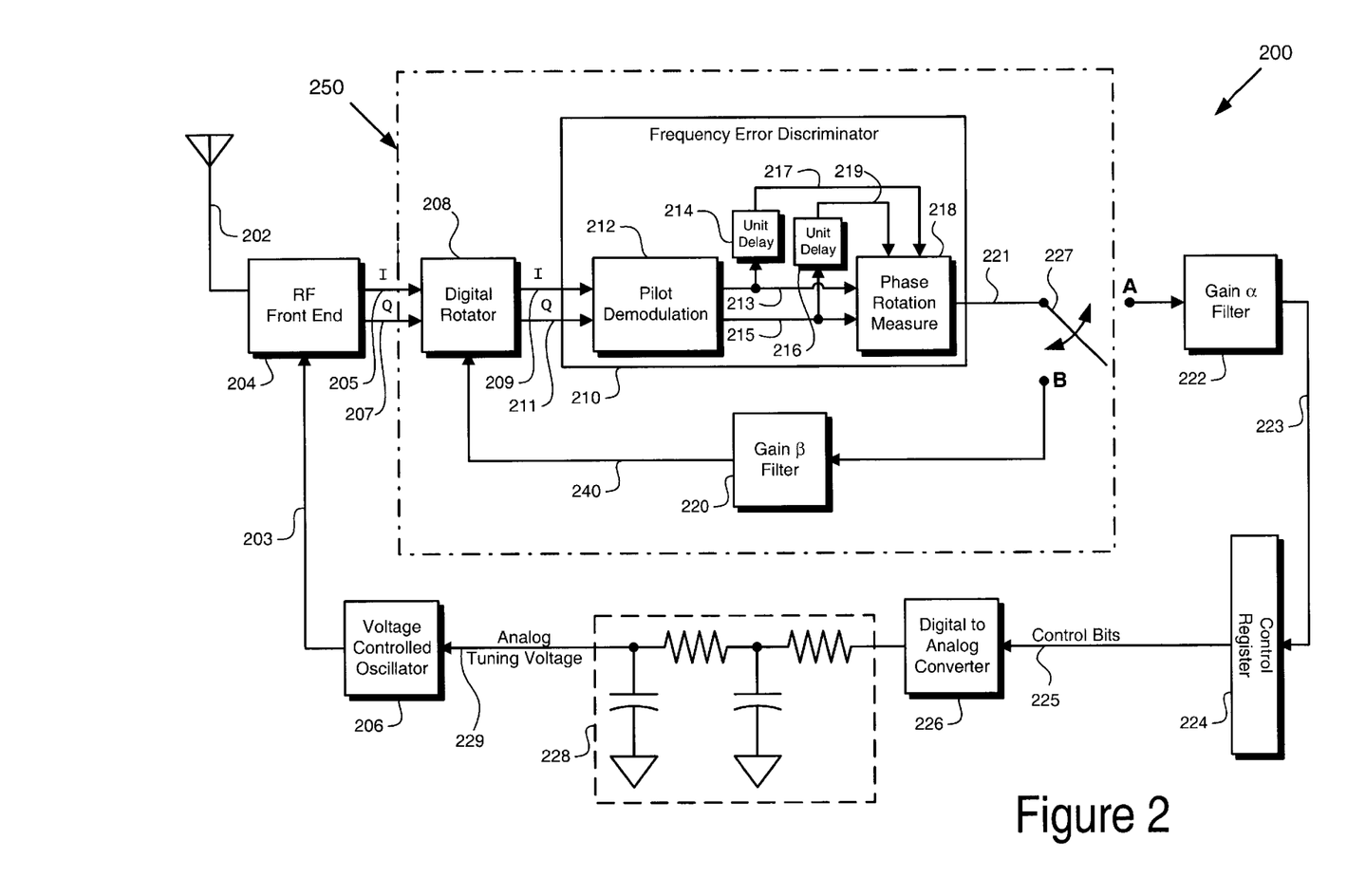
FIG. 2 illustrates, in block diagram form, an example of frequency tracking and calibration of a receiver in a CDMA wireless communication system in accordance with the present invention.

FIG. 2 illustrates an example of frequency tracking and calibration, in accordance with one embodiment, for an exemplary receiver in a CDMA wireless communication system. Exemplary frequency tracking and calibration system 200 shown in FIG. 2 constitutes part of a receiver which may generally reside in a mobile unit, or a CDMA modem, when communication is taking place from a base station to a mobile unit, i.e. when communication is taking place over a forward communication channel in a CDMA wireless communication system.

Frequency tracking and calibration system 200 of FIG. 2 shows various modules and features which correspond in function to those of frequency tracking system 100 of FIG. 1. Modules and features of frequency tracking and calibration system 200 corresponding to those of frequency tracking system 100 are numbered in a manner consistent with FIG. 1. In particular, the loop comprising RF front end 104, frequency error discriminator 110, gain α filter 122, control register 124, digital to analog converter 126, RC filter network 128, and local oscillator 106 corresponds to the loop comprising, respectively, RF front end 204, frequency error discriminator 210, gain α filter 222, control register 224, digital to analog converter 226, RC filter network 228, and local oscillator 206. In addition, receive antenna 102, digital baseband signal I component 105 and Q component 107, control bits 125, and analog tuning voltage 129 are shown, respectively, as receive antenna 202, digital baseband signal I component 205 and Q component 207, control bits 225, and analog tuning voltage 229.

Continuing with FIG. 2, in one embodiment, receive antenna 202 receives RF signal transmission from a base station transmit antenna (not shown) over a forward communication channel in a CDMA wireless communication system. Receive antenna 202 is connected to RF front end 204. RF front end 204 uses frequency synthesizers, which match the frequency of the RF carrier, to convert the RF signal to a baseband signal. For example, RF front end 204 may employ a combination of filters, frequency synthesizers, frequency mixers, amplifiers, and analog to digital conversion to convert the RF signal to a digital baseband signal. The frequency synthesizers used by RF front end 204 receive timing reference 203 from local oscillator 206, which is a voltage controlled oscillator ("VCO") in one embodiment described here. Timing reference 203 is a signal whose frequency is the oscillation frequency of local oscillator 206. For example, local oscillator 206 may be a voltage controlled temperature compensated crystal oscillator ("VCTCXO") with an oscillation frequency of 19.68 MHz rated at +/−5 ppm. Thus, RF front end 204 outputs a digital baseband signal. As seen in FIG. 2, the digital baseband signal has an in-phase component, referred to as I component 205, denoted "I" in FIG. 2, and a quadrature component, referred to as Q component 207, denoted "Q" in FIG. 2.

Continuing with FIG. 2, the digital baseband signal I component 205 and Q component 207 are fed to the input of digital rotator 208. The digital baseband signal comprises a sequence of symbols. Each symbol in the sequence of symbols of the digital baseband signal with I component 205 and Q component 207 can be represented as a point in complex phase space, i.e. as a complex number in the complex plane, using the I and Q components, as I+jQ, where "j" is the complex number equal to the square root of −1. A frequency error, i.e. a mismatch between the carrier frequency synthesized to demodulate the incoming signal in RF front end 204 and the incoming carrier frequency, in local oscillator 206 causes the received sequence of baseband pilot symbols to rotate around the complex plane. For example, a 1 ppm frequency error when RF front end 204 is demodulating a signal with a carrier frequency of 800 MHz causes the received sequence of baseband pilot symbols to rotate around the complex plane 800 times per second.

Digital rotator 208 implements a rotation of the digital baseband signal with I component 205 and Q component 207 in the complex plane. The output of digital rotator 208 is a rotated digital baseband signal with I component 209 and Q component 211. Denoting I component 209 as $I_{rotated}$ and Q component 211 as $Q_{rotated}$, each symbol of the rotated digital baseband signal with I component 209 and Q component 211 can be represented in complex phase space as $I_{rotated}+jQ_{rotated}$. Rotation of a symbol by an angle φ in the complex plane is accomplished by multiplying the symbol by the complex number (cos φ+j sin φ). Thus, the operation of digital rotator 208 can be described by the following equations:

$$I_{rotated}+jQ_{rotated}=(\cos \phi + j \sin \phi)(I+jQ)=(I\cos \phi - Q\sin \phi)+j(I\sin \phi + Q\cos \phi).$$

Thus, when the digital baseband signal with I component 205 and Q component 207 is rotated by the angle φ, rotated digital baseband signal I component 209 is (I cos φ−Q sin φ), and rotated digital baseband signal Q component 211 is (I sin φ+Q cos φ). The angle, φ, of rotation can change for each symbol in the sequence of symbols of the digital baseband signal with I component 205 and Q component 207 and, thus, in general, is constantly changing over time, depending on the input to digital rotator 208 received from gain β filter 220, which is further described below. For example, the input to digital rotator 208 received from gain □ filter 220 can be represented as δn, where n is a time index of the sequence of symbols of the digital baseband signal with I component 205 and Q component 207. The angle of rotation φ for each symbol in the sequence can then be represented by the equation:

$$\phi(n)=\phi(n-1)+\delta(n).$$

This equation shows that digital rotator 208 is producing a frequency correction, also referred to as "frequency translation", because the phase, corresponding to angle φ(n), is changing over time. For example, if δ(n) is a constant, δ, the first symbol in the sequence of symbols of the digital baseband signal with I component 205 and Q component 207 is phase rotated by angle φ(1)=δ, the second symbol in the sequence is phase rotated by angle φ(2)=φ(1)+δ=2δ, and, similarly, the kth symbol in the sequence is phase rotated by angle φ(k)=kδ. The continual phase rotations, thus, change the frequency of the baseband input signal, providing an input signal with a frequency which is adjusted to compensate for the frequency error of local oscillator 206.

Continuing with FIG. 2, the output of digital rotator 208 is coupled to the input of frequency error discriminator 210 so that rotated digital baseband signal I component 209 and Q component 211 are fed to pilot demodulation module 212. Pilot demodulation module 212 performs PN despreading and Walsh decovering, also referred to as Walsh accumulation, to demodulate the input signal as a sequence of pilot symbols. I component pilot symbol 213 is fed to unit delay element 214 and phase rotation measure module 218. Q component pilot symbol 215 is fed to unit delay element 216 and phase rotation measure module 218. Unit delay element 214 makes previous I component pilot symbol 217 available to phase rotation measure module 218 at the same time as current I component pilot symbol 213, and unit delay element 216 makes previous Q component pilot symbol 219 available to phase rotation measure module 218 at the same time as current Q component pilot symbol 215, so that phase rotation measure module 218 can compute the phase rotation between successive symbols, i.e. the phase rotation between the current symbol and the previous symbol. The frequency error of local oscillator 206 is proportional to the phase rotation between successive pilot symbols, i.e. between the current pilot symbol and the previous pilot symbol, thus the frequency error of local oscillator 206 is proportional to error measure 221. Phase rotation measure module 218 outputs error measure 221 to switch 227.

In the case of a RAKE receiver, such as an IS-95A CDMA RAKE receiver which typically has 4 fingers, frequency error discriminator 210 is replicated for each finger of the RAKE receiver. In the case of a RAKE receiver, then, the rotated digital baseband signal would be fed to the frequency error discriminator of each finger, and the error measures from all of the fingers would be summed or averaged into error measure 221 and then fed to switch 227.

Continuing with FIG. 2, error measure 221, which may be a summed or averaged error measure, is fed to switch 227. As seen in FIG. 2, switch 227 can be set to either of two positions, position "A" or position "B". When switch 227 is set to position A, error measure 221 output by frequency error discriminator 210 is fed to gain α filter 222. When switch 227 is set to position A, then, the "local frequency generation loop" comprising RF front end 204, frequency error discriminator 210, gain α filter 222, control register 224, digital to analog converter 226, RC filter network 228, and local voltage controlled oscillator 206 is closed, i.e. operational, whereas digital automatic frequency control loop 250 comprising digital rotator 208, frequency error discriminator 210, and gain β filter 220 is open, i.e. non-operational.

When switch 227 is set to position B, error measure 221 output by frequency error discriminator 210 is fed to gain β filter 220, which is further described below. When switch 227 is set to position B, then, digital automatic frequency control loop 250 comprising digital rotator 208, frequency error discriminator 210, and gain β filter 220 is closed, i.e. operational, whereas the local frequency generation loop comprising RF front end 204, frequency error discriminator 210, gain α filter 222, control register 224, digital to analog converter 226, RC filter network 228, and local oscillator 206 is open, i.e. non-operational. It is noted, however, that even though the local frequency generation loop itself is non-operational, control register 224, digital to analog converter 226, RC filter network 228, and local oscillator 206 are operational and continue to provide timing reference 203 to RF front end 204 using the value of control bits 225 stored in control register 224. Switch 227 may be implemented in any of a number of ways known in the art. For example, logic gates linked to the microprocessor of the mobile unit might be used. In the alternative, a "software switch" could be used. The details of implementing switch 227 are apparent to a person of ordinary skill in the art, and are therefore not presented here.

Continuing with FIG. 2, when switch 227 is set to position B, error measure 221 output by frequency error discriminator 210 is fed to gain β filter 220. Gain β filter 220 multiplies error measure 221 by the gain β, and provides a filtered error measure, referred to as phase difference 240, in the form of a correction $\delta(n)$ to the rotation angle $\phi(n)$, as described above, to digital rotator 208. Correction $\delta(n)$ is also referred to as a "correction value" in the present application. The gain, β, of gain β filter 220 is adjustable. The adjustment may be provided, for example, to properly balance and ensure correct feedback operation of the digital automatic frequency control loop comprising digital rotator 208, frequency error discriminator 210, and gain β filter 220.

Continuing with FIG. 2, when switch 227 is set to position A, error measure 221 output by frequency error discriminator 210 is fed to gain α filter 222. Gain α filter 222 multiplies the error measure by the gain, α, and provides the filtered error measure in the form of control bits 223 to control register 224. The gain, α, of gain α filter 222 is adjustable. The adjustment may be provided, for example, to properly balance and ensure correct feedback operation of the local frequency generation loop comprising RF front end 204, frequency error discriminator 210, gain α filter 222, control register 224, digital to analog converter 226, RC filter network 228, and local oscillator 206.

Control register 224 provides storage for control bits 223 which are output as control bits 225 from control register 224 to digital to analog converter 226. Digital to analog converter 226 converts control bits 225, which digitally represent a control value, into an analog form, such as a voltage whose analog quantity is directly proportional to the control value. Digital to analog conversion may be provided in many forms, for example, digital to analog converter 226 might be a pulse density modulator ("PDM"). In one embodiment, digital to analog converter 226 provides as output an analog control voltage which varies according to the value of control bits 225.

RC filter network 228 filters out any residual fluctuations in the output voltage of digital to analog converter 226 to provide analog tuning voltage 229, i.e. control voltage, to local oscillator 206, which in the example used to describe one embodiment, is a voltage controlled oscillator. Analog tuning voltage 229 sets, i.e. corrects, the oscillation frequency of local oscillator 206, which corrects timing reference 203, so that the frequency synthesizers used by RF front end 204 match the frequency of the RF carrier.

In summary, referring to FIG. 2, when switch 227 is set to position A, frequency tracking and calibration system 200 operates in a mode, referred to as "mode A", in which the local frequency generation loop comprising RF front end 204, frequency error discriminator 210, gain α filter 222, control register 224, digital to analog converter 226, RC filter network 228, and local voltage controlled oscillator 206 is closed, i.e. operational. Operation of frequency tracking and calibration system 200 in mode A can be initialized by placing an initial value of control bits 225 in control register 224. The initial value may be an empirically derived one, for example, or may come from a "calibration table" for quicker and more efficient stabilization of the loop.

In mode A, operation of digital rotator 208 is practically disabled. In other words, in mode A, the output signal of digital rotator 208 is substantially the same as the input signal to digital rotator 208. Disabling digital rotator 208 can be effected in a number of different ways. For example, a switch or logic may be provided to shunt the input signal, i.e. digital baseband signal with I component 205 and Q component 207, around digital rotator 208 to frequency error discriminator 210 whenever switch 227 is set to position A. As another example, the rotation angle φ used by digital rotator 208 may be set to zero whenever switch 227 is set to position A, and digital rotator 208 can continue to operate since rotation by angle zero has no effect on the input signal. Thus, the operation in mode A of the local frequency generation loop comprising RF front end 204, frequency error discriminator 210, gain α filter 222, control register 224, digital to analog converter 226, RC filter network 228, and local oscillator 206 is unaffected by digital rotator 208. In mode A, the digital automatic frequency control loop comprising digital rotator 208, frequency error discriminator 210, and gain β filter 220 is open, i.e. non-operational.

Moreover, referring to FIG. 2, when switch 227 is set to position B, frequency tracking and calibration system 200 operates in a mode, referred to as "mode B", in which digital automatic frequency control loop 250 comprising digital rotator 208, frequency error discriminator 210, and gain β filter 220 is closed, i.e. operational. In mode B, the local frequency generation loop comprising RF front end 204, frequency error discriminator 210, gain α filter 222, control register 224, digital to analog converter 226, RC filter network 228, and local oscillator 206 is open, i.e. non-operational. Thus, when frequency tracking and calibration system 200 operates in mode B, gain α filter 222 does not provide input to control register 224. Local voltage controlled oscillator 206 continues to operate, however, at the frequency determined by the value of control bits 225 stored in control register 224.

When operating in mode B, then, the value of control bits 225 stored in control register 224 can be changed, i.e. a perturbation value can be inserted in control register 224, to produce an offset in the oscillation frequency of local voltage controlled oscillator 206, which in turn produces a frequency offset in digital baseband signal with I component 205 and Q component 207, which is input to digital rotator 208. Digital rotator 208 corrects the frequency offset by adjusting the phase of digital baseband signal with I component 205 and Q component 207, i.e. producing rotated digital baseband signal with I component 209 and Q component 211, which is input to frequency error discriminator 210. Digital rotator 208 corrects the frequency offset by adjusting the phase of digital baseband signal with I component 205 and Q component 207 according to the feedback, i.e. phase difference 240, received from frequency error discriminator 210 through gain β filter 220. When digital automatic frequency control loop 250 achieves stable operation, the frequency offset can be determined. Digital automatic frequency control loop 250 achieves stable operation, for example, when phase difference 240, which is the input to digital rotator 208 from gain □ filter 220, is no longer substantially changing. When phase difference 240 is no longer substantially changing, the output of frequency error discriminator 210, i.e. error measure 221, is approximately equal to zero. Thus, for example, stable operation of digital automatic frequency control loop 250 may be determined by checking and reading the output of frequency error discriminator 210 to determine when error measure 221 is approximately equal to zero. When digital automatic frequency control loop 250 achieves stable operation the frequency offset can be determined, for example, by dividing phase difference 240, which is the magnitude of the phase adjustment input to digital rotator 208, by the time between symbols in the digital baseband signal with I component 205 and Q component 207. When stable operation is determined, the perturbation value and the corresponding frequency offset may be entered in a calibration table stored in the mobile unit's memory. For example, a flash memory or other non-volatile memory may be used to store the calibration table. The values stored in the table can then be used to adjust the value of control bits 225 inserted into control register 224 for more efficient operation of frequency tracking and calibration system 200 in mode A.

For example, during pilot searching, frequency tracking and calibration system 200 may be configured to operate in mode A. By using a value from the calibration table to adjust the value of control bits 225 inserted into control register 224, frequency tracking and calibration system 200 can introduce a known frequency error, or a predetermined frequency offset, for use in searching for the pilot signal. For example, if voltage controlled oscillator 206 has a tolerance of +/−5 ppm and is being used as a time reference to synthesize an 800 MHz RF carrier, the carrier frequency being synthesized could have an error of +/−4000 Hz. This frequency error is directly translated to the baseband signal. By reading values from the calibration table into control register 224, an orderly frequency search can be conducted where pilot searches are performed after changing the frequency in 1000 Hz increments. Thus, by implementing a more precise frequency search, frequency tracking and calibration system 200 is able to reduce time and power consumption during pilot searching.

Frequency tracking and calibration system 200 may be configured to enter mode B operation as needed, for example, when the temperature of the mobile unit changes. As described above, temperature affects the oscillation frequency of crystal oscillators. Each mobile unit typically contains a temperature sensor, so for example, frequency tracking and calibration system 200 may be configured to enter mode B operation whenever the temperature sensor in the mobile unit signals a change in temperature. Also for example, the calibration table may be expanded to provide corresponding perturbation values and frequency offsets for each temperature value.

As a further example, frequency tracking and calibration system 200 may be configured to enter mode B operation for the "wake up" portion of quick paging, described above. By using a value from the calibration table to adjust the value of control bits 225 inserted into control register 224 at wake up, frequency tracking can be achieved in mode B for the short amount of time required for checking for incoming calls. Mode B can be used to determine the precise value of frequency offset present using the digital rotator. This frequency offset is used as an index into the calibration table to determine the value of control bits 225 inserted into control register 224 to correct the frequency error on the next wakeup. This procedure avoids the long time interval required to run the frequency tracking loop in mode A. Mode B operation can be completed much faster than mode A operation and consumes less power than mode A operation. Thus, by using the calibration table with mode B operation, frequency tracking and calibration system 200 is able to reduce wake up time and power consumption during quick paging. Thus, FIG. 2 describes an example of frequency tracking and calibration, in accordance with one embodiment, for an exemplary receiver in a CDMA wireless communication system.

Figure 3:
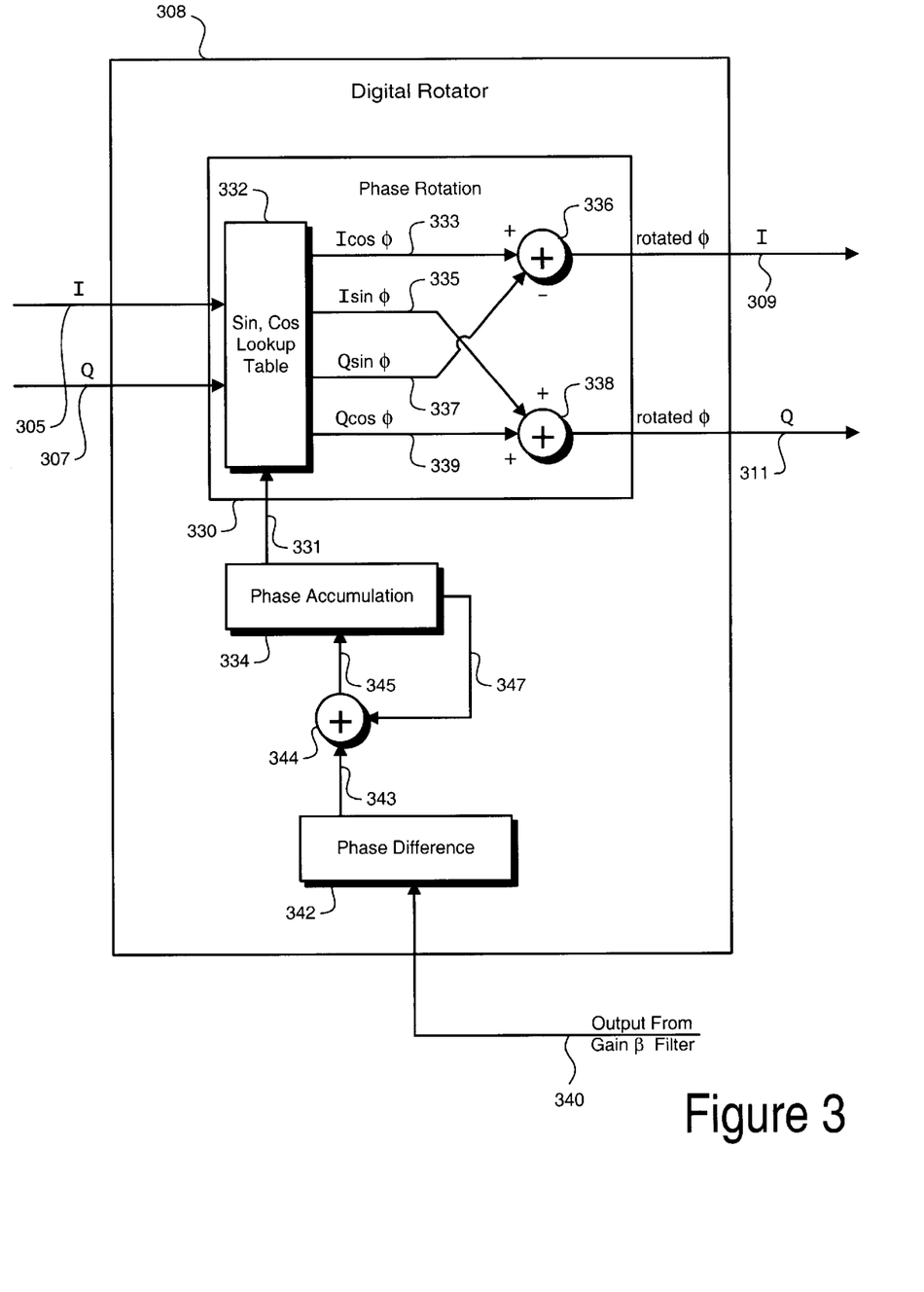
FIG. 3 describes in greater detail the digital rotator shown in FIG. 2.

FIG. 3 illustrates an example implementation of a digital rotator in accordance with one embodiment. FIG. 3 shows exemplary digital rotator 308 which corresponds to digital rotator 208 of FIG. 2. Digital rotator 308 receives input signals 305 and 307, corresponding, respectively, to digital baseband signal I component 205 and digital baseband signal Q component 207 of FIG. 2, and produces rotated output signals 309 and 311, respectively corresponding to rotated digital baseband signal I component 209 and rotated digital baseband signal Q component 211 of FIG. 2.

Each symbol in the sequence of symbols of input signals 305 and 307 can be represented in the complex plane, i.e. as a complex number, using the I and Q components, as I+jQ, where "j" is the complex number equal to the square root of −1. Using the I and Q components of the rotated output signals 309 and 311, denoted $I_{rotated}$ and $Q_{rotated}$, respectively, each symbol of rotated output signals 309 and 311 also can be represented in the complex plane, as $I_{rotated}+jQ_{rotated}$. Phase rotation of a symbol by an angle φ in the complex plane is accomplished by multiplying the symbol by the complex number (cos φ+jsin φ). Thus, phase rotation by an angle φ of each symbol of input signals 305 and 307 into a symbol of rotated output signals 309 and 311 can be described by the following equations:

$$I_{rotated}+jQ_{rotated}=(\cos \phi+j \sin \phi)(I+jQ)=(I\cos \phi-Q\sin \phi)+j(I\sin \phi+Q\cos \phi).$$

Thus, when input signals 305 and 307 are rotated by an angle φ, rotated output signal 309 (the I component ) is (I cos φ−Q sin φ) and rotated output signal 311 (the Q component) is (I sin φ+Q cos φ).

As seen in FIG. 3, the input signals 305 and 307 are fed to digital rotator 308, where they are directed to an input of phase rotation module 330. Phase rotation module 330 of digital rotator 308 implements a phase rotation of input signals 305 and 307 in the complex plane. Phase rotation module 330 uses trigonometric lookup table 332 to provide values of the trigonometric functions sine and cosine, abbreviated "sin" and "cos" respectively, corresponding to angle φ 331 provided to trigonometric lookup table 332 by phase accumulation module 334, as shown in FIG. 3. Using input signals 305 and 307 and angle φ 331 as inputs, and performing appropriate lookup and multiplication operations, trigonometric lookup table 332 outputs the values I cos φ 333 and Q sin φ 337 as inputs to adder 336, and the values I sin φ 335 and Q cos φ 339 as inputs to adder 338, as shown in FIG. 3. Trigonometric lookup table 332 may be implemented in a number of ways, for example, the entire table and multiplication operations could be implemented in hardware, or the lookup and multiplication operations could be implemented in software with trigonometric values stored in a read only memory.

As shown in FIG. 3, the values I cos φ 333 and Q sin φ 337 are provided to adder 336. I cos φ 333 is provided to a positive input of adder 336, marked "+" in FIG. 3, and Q sin φ 337 is provided to a negative input of adder 336, marked "−" in FIG. 3. The positive input does not modify its value, whereas the negative input inverts or produces the negative of its value, so that the output of adder 336 is (I cos φ−Q sin φ). Thus, the output of adder 336, i.e. rotated output signal 309, is the I component in the above equation. Also as shown in FIG. 3, the values I sin φ 335 and Q cos φ 339 are provided to adder 338. Both values I sin φ 335 and Q cos φ 339 are provided to positive inputs of adder 338, marked "+" in FIG. 3, so that the output of adder 338 is (I sin φ+Q cos φ). Thus, the output of adder 338, i.e. rotated output signal 311, is the Q component in the above equation. Hence, from input signals 305 and 307 and phase rotation angle φ 331, phase rotation module 330 produces I and Q components, i.e. rotated output signals 309 and 311, and directs them to the output of digital rotator 308. Thus, the output of digital rotator 308 is rotated output signals 309 and 311.

The value of phase rotation angle φ 331 used by phase rotation module 330 is determined from gain β filter output 340 corresponding to phase difference 240 output from gain β filter 220 of FIG. 2. Gain β filter output 340 is input to digital rotator 308 as an error correction to phase rotation angle φ 331. In other words, the error correction to phase rotation angle φ 331 is phase difference 343, which may be positive or negative, that is added to the current phase rotation angle φ 347, by adder 344, to increase or decrease current phase rotation angle φ 347, respectively, as the phase difference is positive or negative. Thus, gain β filter output 340 is fed into phase difference register 342 where it is stored as phase difference 343, and is added to the current phase rotation angle φ 347, stored in phase accumulation register 334 by adder 344, as shown in FIG. 3. The addition is performed each time a new symbol in the sequence of symbols of input signals 305 and 307 is input to the digital rotator. If the value of phase difference 343 stored in phase difference register 342 is represented as δ(n), where n is a time index of the sequence of symbols of input signals 305 and 307, the update to phase rotation angle φ 331 over time can be expressed by the equation:

$$\phi(n)=\phi(n-1)+\delta(n).$$

This equation shows that digital rotator 308 is applying a frequency correction, or translation, to baseband input signals 305 and 307 because the phase rotation angle, corresponding to angle φ(n), being applied to baseband input signals 305 and 307 is changing over time. Thus, FIG. 3 describes an example implementation of digital rotator 308 in accordance with one embodiment.

Figure 4:
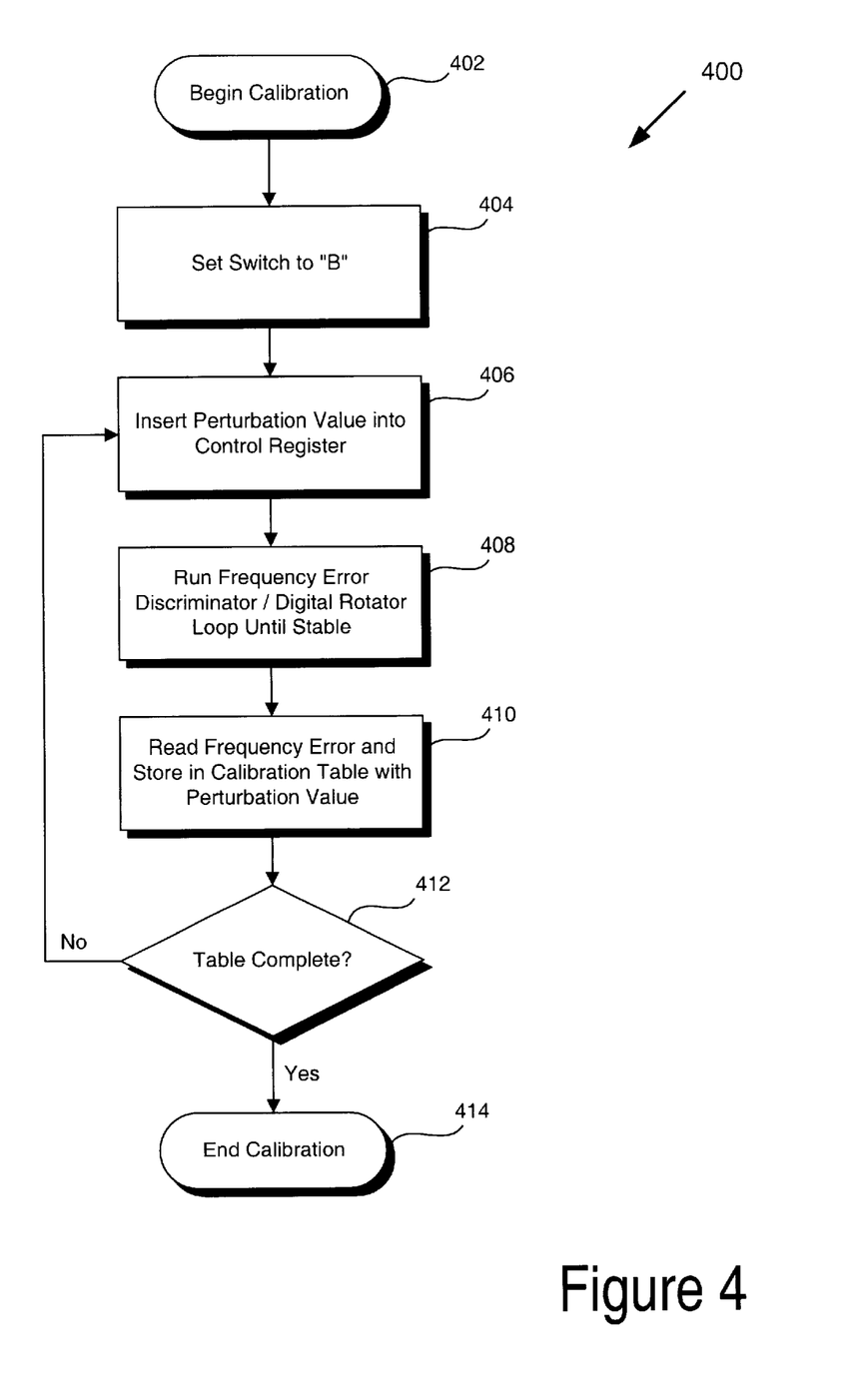
FIG. 4 is a flow chart describing frequency calibration in accordance with the present invention.

FIG. 4 shows flow chart 400 describing one example of constructing a calibration table for frequency tracking in accordance with one embodiment. Flowchart 400 shown in FIG. 4 describes a process which may be performed in a receiver which may generally reside in a mobile unit when communication is taking place in a forward channel. The process shown in flowchart 400 can be performed by a frequency tracking system, such as frequency tracking and calibration system 200, for example, in a mobile unit or CDMA modem in a CDMA communication system or spread spectrum communication system.

Referring to FIG. 4, at step 402 the invention's process for constructing a calibration table for frequency tracking, also referred to as "calibration process", begins. Initiation of the calibration process may be triggered, for example, by the temperature sensor in the mobile unit signaling a change in temperature, as noted above. Also, for example, initiation of the calibration process may be triggered at specified intervals of time, for example, every second.

Using exemplary frequency tracking and calibration system 200 for illustration purposes, at step 404 the calibration process initiates by setting switch 227 of frequency tracking and calibration system 200 to position B. As described above, setting switch 227 to position B enables operation of frequency tracking and calibration system 200 in mode B, i.e. digital automatic frequency control loop 250 comprising digital rotator 208, frequency error discriminator 210, and gain β filter 220 is closed, i.e. operational, whereas the local frequency generation loop comprising control register 224, digital to analog converter 226, RC filter network 228, local voltage controlled oscillator 206, RF front end 204, and frequency error discriminator 210 is open.

Continuing with FIG. 4, at step 406 a perturbation value is inserted into control register 224 of frequency tracking and calibration system 200. The perturbation value is a known, or predetermined, value for control bits 225. For example, frequency tracking and calibration system 200 can be run in mode A until a stable value is achieved for the value of control bits 225 in control register 224. Then, the value of control bits 225 may be read from control register 224 and a known offset may be arithmetically added to the value of control bits 225 to produce a perturbation value to be inserted into control register 224 when frequency tracking and calibration system 200 is switched to operation in mode B.

A number of perturbation values are produced, one for each entry of the calibration table. Once a perturbation value for control bits 225 has been inserted into control register 224, digital to analog converter 226 converts the perturbation value of control bits 225 to an analog valued voltage, which is smoothed by RC filter network 228, as described above, to provide analog tuning voltage 229 to local oscillator 206. Thus, the perturbation value inserted in control register 224 produces a frequency error in the oscillation frequency of local oscillator 206. As described above, the frequency error of local oscillator 206 is proportional to the phase rotation between successive pilot symbols; thus, phase rotation measure module 218 of frequency error discriminator 210 outputs error measure 221, to gain β filter 220. Gain β filter 220 provides phase difference 240, which functions as a correction to the phase rotation angle, as described above, to an input of digital rotator 208.

At step 408 of flowchart 400, digital automatic frequency control loop 250 comprising digital rotator 208, frequency error discriminator 210, and gain β filter 220 is allowed to run until stable. As described above in connection with FIG. 2, when digital automatic frequency control loop 250 achieves stable operation, the frequency offset can be determined. Digital automatic frequency control loop 250 achieves stable operation, for example, when phase difference 240, which is the input to digital rotator 208 from gain □ filter 220, is no longer substantially changing. When digital automatic frequency control loop 250 achieves stable operation the frequency offset can be determined, for example, by dividing phase difference 240 by the time between symbols in the digital baseband signal with I component 205 and Q component 207. Also, for example, using the implementation of digital rotator 308 illustrated in FIG. 3, the frequency offset may be computed by reading phase difference 343 in phase difference register 342 and dividing it by the time between symbols in digital baseband input signals 305 and 307.

At step 410 of flowchart 400, the frequency error can be determined from digital rotator 208, as described above, and stored in the calibration table with the perturbation value of control bits 225, read from control register 224. Thus, the calibration table, which for example, may be stored in a non-volatile memory in the mobile unit, preserves the relationship between the control value contents of control register 224, i.e. the perturbation value, and the frequency error of local oscillator 206 as measured digitally with great precision using digital rotator 208. Moreover, if a value of the mobile unit's temperature sensor is stored concurrently, a calibration table can be built which preserves the relationship between temperature, control value, and local oscillator frequency error.

At step 412, the process determines whether the calibration table is complete. For example, the calibration table may be determined to be complete based on the number of table entries calibrated for each temperature. In this example, "table entry" refers to the combination of a temperature value, a control value, and a frequency error. A reasonable number of table entries would be in the range of 5 to 20 table entries for each temperature value calibrated. For example, if 5 table entries have been calibrated, the table may be determined to be complete for the temperature value being calibrated. As another example, the table may be determined to be complete if a particular range of frequency errors have been calibrated. For the example of an 800 MHz frequency synthesizer given above, in which the frequency can be expected to be accurate to within 4,000 Hz error, a table entry may be produced for each 1,000 Hz of frequency error in the range of −4,000 Hz to +4,000 Hz. When the process determines that the calibration table is not complete, the process proceeds by returning to step 406 and continuing with a new perturbation value inserted into control register 224. When the process determines that the calibration table is complete, the process proceeds to step 414.

At step 414, the calibration process ends. During the calibration process frequency tracking and calibration system 200 operates in mode B. At the end of the calibration process, operation in mode B may be continued or initiated, for example, if a quick paging check is to be performed. As another example, at the end of the calibration process operation of frequency tracking and calibration system 200 may be returned to mode A by setting switch 227 to position A. Thus, FIG. 4 illustrates an example calibration process for building a calibration table for frequency tracking in accordance with one embodiment.

It is appreciated by the above description that the invention provides apparatus and method for calibrating local oscillation frequency in wireless communications. According to an embodiment of the invention described above, a known frequency error is translated into an analog tuning voltage for the voltage controlled oscillator used as a timing reference in a receiver for a wireless communication system. Moreover, according to an embodiment of the invention described above, a relationship between the frequency errors and the digital control values used to determine the tuning voltages is encoded to provide quick and efficient translation between the frequency error and the analog tuning voltage. Although the invention is described as applied to communications in a CDMA system, it will be readily apparent to a person of ordinary skill in the art how to apply the invention in similar situations where digital to analog translation is needed for tuning of a voltage controlled or current controlled analog device or circuit.

From the above description, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, although embodiments are described here chiefly with reference to CDMA wireless communication systems the invention can be used in any type of communication system where accurate timing reference is needed, for example, time division multiple access ("TDMA") communication systems. Also, for example, the digital rotator presented in an embodiment described here can be implemented in hardware or in software or a combination of both. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, apparatus and method for calibrating local oscillation frequency in wireless communications have been described.

What is claimed is:

1. A receiver comprising:
   a digital automatic frequency control loop configured to receive a baseband input signal having a first frequency, said digital automatic frequency control loop comprising a frequency error discriminator, said frequency error discriminator being configured to produce an error measure, said digital automatic frequency control loop further comprising:
  a digital rotator configured to receive said baseband input signal having said first frequency, said digital rotator providing a rotated digital baseband output to said frequency error discriminator for producing said error measure; and
  a local frequency generation loop, said local frequency generation loop comprising:
    an oscillator for oscillating at a second frequency and for producing a frequency offset in the baseband input signal; and
    a control register for controlling the second frequency of the oscillator, wherein a perturbation value is inserted into the control register to reduce the error measure.

2. The receiver of claim 1 wherein said frequency error discriminator further comprises a pilot demodulation module providing a sequence of pilot symbols to a phase rotation measure module, said phase rotation measure module computing a phase rotation between a current pilot symbol and a previous pilot symbol in said sequence of pilot symbols, said phase rotation determining said error measure.

3. The receiver of claim 1 further comprising a gain β filter having an input for receiving said error measure, said gain β filter having an output coupled to said digital rotator.

4. The receiver of claim 1 wherein said local frequency generation loop further comprises a gain α filter coupled to an output of said frequency error discriminator, said gain α filter having an output coupled to the control register.

5. The receiver of claim 4 wherein said local frequency generation loop comprises a digital to analog converter having an input coupled to an output of said control register, said digital to analog converter having an output coupled to said oscillator, said output of said digital to analog converter causing said oscillator to oscillate at said second frequency.

6. The receiver of claim 5 wherein said oscillator is a voltage controlled oscillator.

7. The receiver of claim 5 wherein said local frequency generation loop further comprises an RC filter network having an input coupled to said output of said digital to analog converter, said RC filter network having an output connected to said oscillator, said output of said RC filter network setting said oscillator to oscillate at said second frequency.

8. The receiver of claim 1 further comprising a switch, said switch being configured to open said local frequency generation loop when said digital automatic frequency control loop is closed and to open said digital automatic frequency control loop when said local frequency generation loop is closed.

9. A method in a digital automatic frequency control loop comprising a digital rotator in combination with a frequency error discriminator, said method comprising steps of:
  receiving a digital baseband input signal having a first frequency;
  supplying a rotated digital baseband output to said frequency error discriminator;
  producing an error measure for causing an adjustment in said first frequency;
  causing an oscillator in a local frequency generation loop to oscillate at a second frequency;
  utilizing a plurality of control bits in a control register in said local frequency generation loop to control said second frequency of the oscillator;
  producing a frequency offset in the baseband input signal by adjusting the second frequency; and
  inserting a perturbation value into the control bits to reduce the error measure.

10. The method of claim 9 wherein said adjustment corresponds to a frequency error in said second frequency of said oscillator.

11. The method of claim 10 further comprising a step of entering into a calibration table said frequency error corresponding to said plurality of control bits.

12. The method of claim 9 further comprising a step of feeding back said error measure to said digital rotator.

13. The method of claim 12 wherein said step of feeding back comprises providing said error measure to a gain β filter having an output coupled to said digital rotator.

14. The method of claim 9 wherein said digital baseband input signal having said first frequency comprises a sequence of symbols, each symbol of said sequence of symbols having an in-phase component and a quadrature component.

15. The method of claim 9 wherein said utilizing step comprises digital to analog conversion of said plurality of control bits to cause said oscillator to oscillate at said second frequency.

16. The method of claim 15 wherein said oscillator is a voltage controlled oscillator, and said digital to analog converter outputs an analog control voltage to cause said oscillator to oscillate at said second frequency.

17. A receiver comprising a digital automatic frequency control loop and a local frequency generation loop, said digital automatic frequency control loop receiving a baseband input signal having a first frequency and said local frequency generation loop including an oscillator for oscillating at a second frequency, said digital automatic frequency control loop comprising:
  a digital rotator configured to receive said baseband input signal having said first frequency, said digital rotator providing a rotated digital baseband output to a frequency error discriminator for producing an error measure, said error measure causing an adjustment in said first frequency, said adjustment corresponding to a frequency error in said second frequency.

18. The receiver of claim 17 wherein said frequency error discriminator further comprises a pilot demodulation module providing a sequence of pilot symbols to a phase rotation measure module, said phase rotation measure module computing a phase rotation between a current pilot symbol and a previous pilot symbol in said sequence of pilot symbols, said phase rotation determining said error measure.

19. The receiver of claim 17 further comprising a gain β filter having an input for receiving said error measure, said gain β filter having an output coupled to said digital rotator.

20. The receiver of claim 17 wherein said local frequency generation loop comprises a gain α filter coupled to an output of said frequency error discriminator, said gain α filter having an output coupled to a control register.

21. The receiver of claim 17 wherein said local frequency generation loop comprises a digital to analog converter having an input coupled to an output of a control register, said digital to analog converter having an output coupled to said oscillator, said output of said digital to analog converter causing said oscillator to oscillate at said second frequency.

22. The receiver of claim 17 further comprising a switch, said switch being configured to open said local frequency generation loop when said digital automatic frequency control loop is closed and to open said digital automatic frequency control loop when said local frequency generation loop is closed.

* * * * *

UNITED STATES PATENT AND TRADEMARK OFFICE
CERTIFICATE OF CORRECTION

PATENT NO. : 6,704,555 B2
DATED : March 9, 2004
INVENTOR(S) : Sih et al.

It is certified that error appears in the above-identified patent and that said Letters Patent is hereby corrected as shown below:

<u>Title page,</u>
Insert Item:
-- [60]  Provisional Application No. 60/260,432 --.

Signed and Sealed this

Twenty-seventh Day of July, 2004

JON W. DUDAS
*Acting Director of the United States Patent and Trademark Office*